(12) United States Patent
O'Neil et al.

(10) Patent No.: US 11,061,436 B2
(45) Date of Patent: Jul. 13, 2021

(54) FLEXIBLE DISPLAY HINGED DEVICE

(71) Applicant: Microsoft Technology Licensing, LLC, Redmond, WA (US)

(72) Inventors: Daniel G. O'Neil, Sammamish, WA (US); James Trzaskos, Redmond, WA (US); Krzysztof Jan Luchowiec, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/853,536

(22) Filed: Dec. 22, 2017

(65) Prior Publication Data

US 2019/0196541 A1  Jun. 27, 2019

(51) Int. Cl.
| | |
|---|---|
| G06F 1/16 | (2006.01) |
| H04M 1/02 | (2006.01) |
| E05D 7/00 | (2006.01) |
| E05D 1/04 | (2006.01) |

(52) U.S. Cl.
CPC ............ *G06F 1/1616* (2013.01); *E05D 1/04* (2013.01); *E05D 7/00* (2013.01); *G06F 1/1641* (2013.01); *G06F 1/1652* (2013.01); *G06F 1/1681* (2013.01); *H04M 1/0216* (2013.01); *H04M 1/0268* (2013.01); *E05Y 2900/606* (2013.01); *G06F 2203/04102* (2013.01)

(58) Field of Classification Search
CPC ....................................................... H05K 5/00
See application file for complete search history.

(56) References Cited

U.S. PATENT DOCUMENTS

| | | | |
|---|---|---|---|
| 2014/0123436 A1* | 5/2014 | Griffin | ................ H04M 1/0216 16/221 |
| 2015/0131222 A1* | 5/2015 | Kauhaniemi | ........ H05K 5/0226 361/679.27 |
| 2015/0169006 A1 | 6/2015 | Chong et al. | |
| 2016/0164852 A1 | 6/2016 | Mccoy et al. | |
| 2016/0195901 A1 | 7/2016 | Kauhaniemi et al. | |
| 2016/0370828 A1 | 12/2016 | Hsu et al. | |

(Continued)

FOREIGN PATENT DOCUMENTS

| | | |
|---|---|---|
| CN | 206309761 U | 7/2017 |
| CN | 206559426 U | 10/2017 |

(Continued)

OTHER PUBLICATIONS

"International Search Report and Written Opinion Issued in PCT Application No. PCT/US2018/063505", dated Mar. 15, 2019, 21 Pages.

(Continued)

*Primary Examiner* — Jerry Wu
(74) *Attorney, Agent, or Firm* — Rainier Patents, P.S.

(57) ABSTRACT

The description relates to devices, such as computing devices that have hinged portions. One example can include a first portion and a second portion. The example can also include a first exoskeletal hinge segment secured to the first portion and a second exoskeletal hinge segment secured to the second portion. The first exoskeletal hinge segment can define an arcuate tab that travels in an arcuate cavity defined by the second exoskeletal hinge segment to allow relative rotation between the first and second portions.

20 Claims, 16 Drawing Sheets

(56) References Cited

U.S. PATENT DOCUMENTS

| | | |
|---|---|---|
| 2017/0023986 A1* | 1/2017 | Xin .................... E05D 15/0621 |
| 2017/0048996 A1* | 2/2017 | Han .................... H05K 5/0217 |
| 2017/0061836 A1* | 3/2017 | Kim .................... G06F 1/1652 |
| 2018/0150107 A1 | 5/2018 | Lee et al. |
| 2018/0164852 A1 | 6/2018 | Lim et al. |
| 2019/0173041 A1 | 6/2019 | Large et al. |
| 2021/0028387 A1 | 1/2021 | Large et al. |

FOREIGN PATENT DOCUMENTS

| | | |
|---|---|---|
| EP | 2728433 A1 | 5/2014 |
| EP | 2874043 A1 | 5/2015 |

OTHER PUBLICATIONS

"OLED Association", Retrieved from: http://www.oled-a.org/, Retrieved Date: Nov. 8, 2017, 25 Pages.

"Final Office Action Issued in U.S. Appl. No. 15/832,639", dated Dec. 12, 2019, 11 Pages.

"Non-Final Office Action Issued in U.S. Appl. No. 15/832,639", dated May 31, 2019, 10 Pages.

Humphries, Matthew, "Lenovo Demos Folio Folding Tablet", Retrieved from: http://in.pcmag.com/lenovo-1/115881/news/lenovo-demos-folio-folding-tablet, Jul. 25, 2017, 4 Pages.

"International Search Report and Written Opinion Issued in PCT Application No. PCT/US18/062374", dated Feb. 27, 2019, 11 Pages.

"Applicant Initiated Interview Summary Issued in U.S. Appl. No. 15/832,639", dated Feb. 19, 2020, 3 Pages.

* cited by examiner

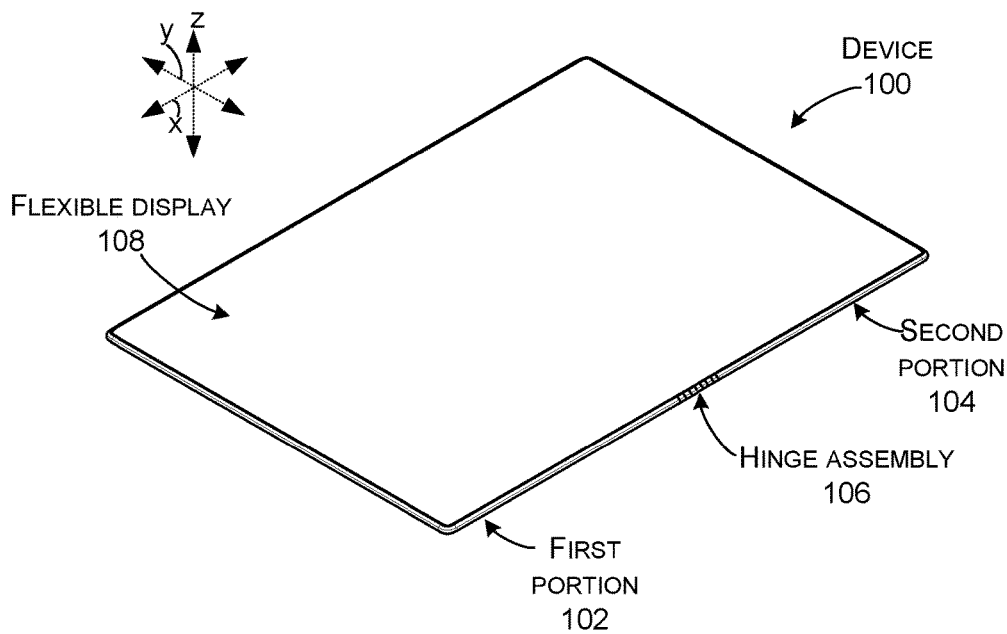
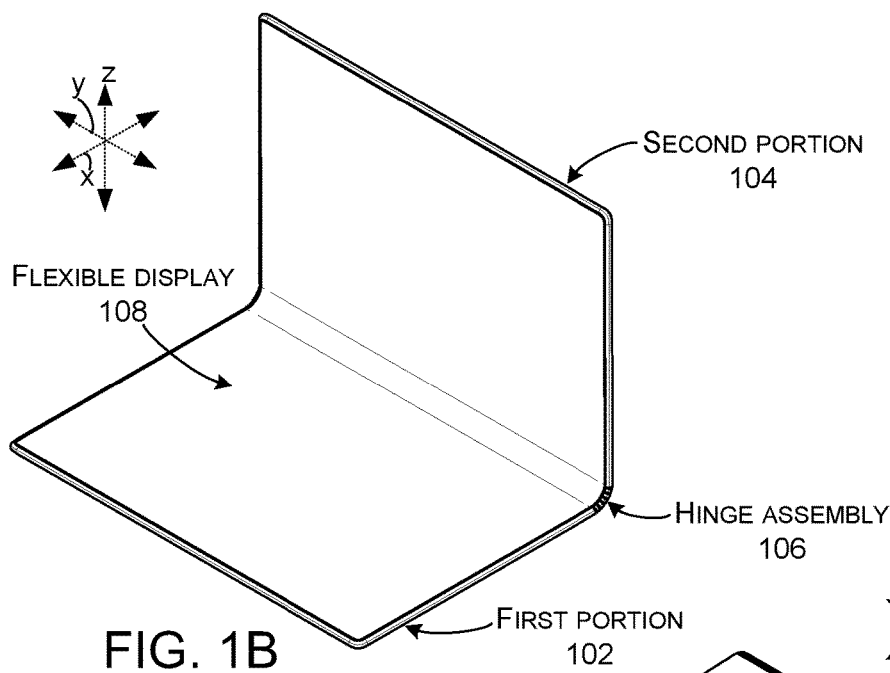
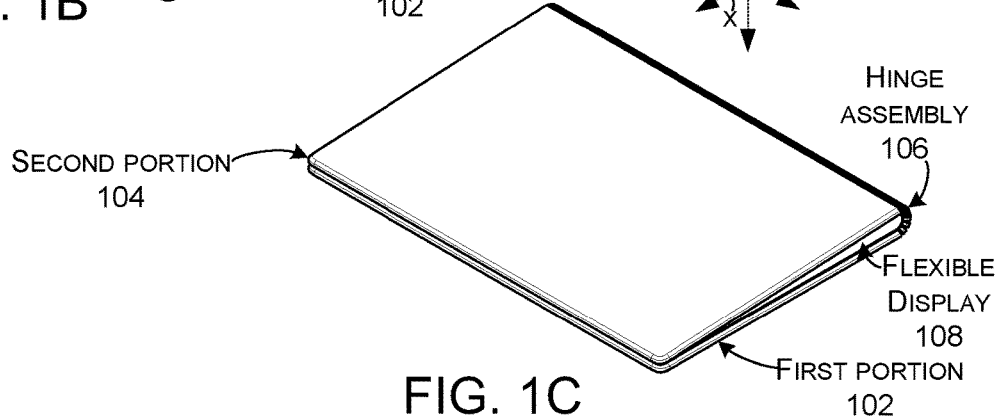

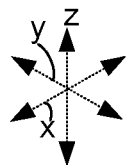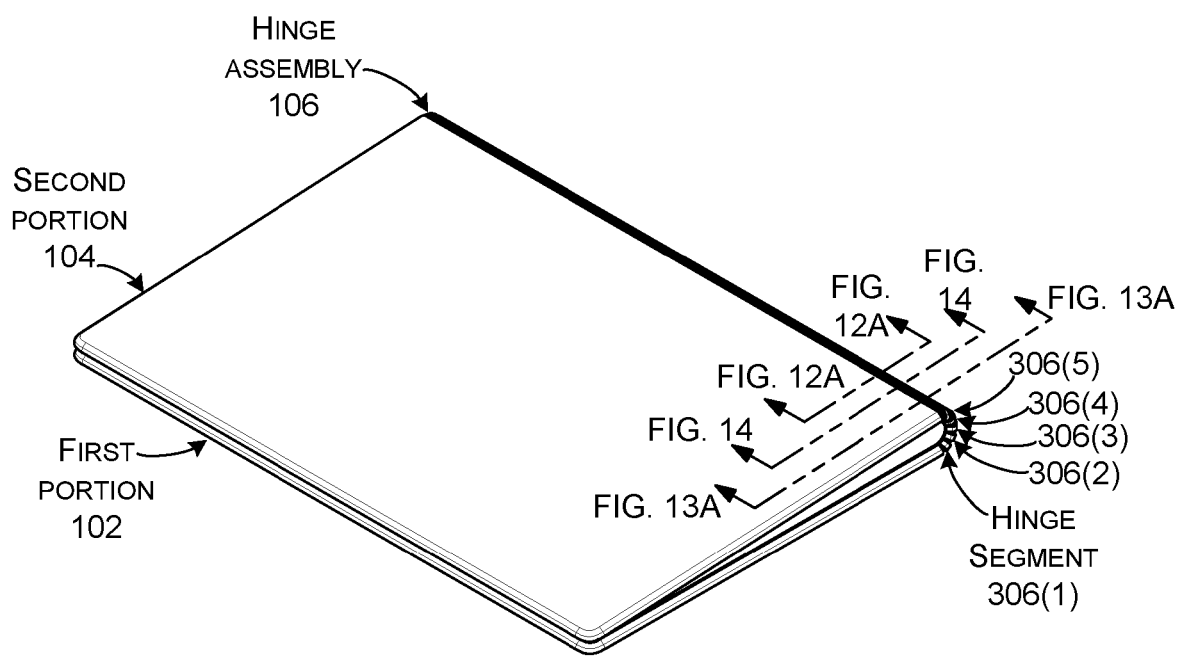
FIG. 11

FLEXIBLE DISPLAY HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1A-1C, 2, 3A, 7, and 11 are perspective views of an example hinged device that can avoid imparting stress forces on a flexible display in accordance with some implementations of the present concepts.

DESCRIPTION

Figure 2:
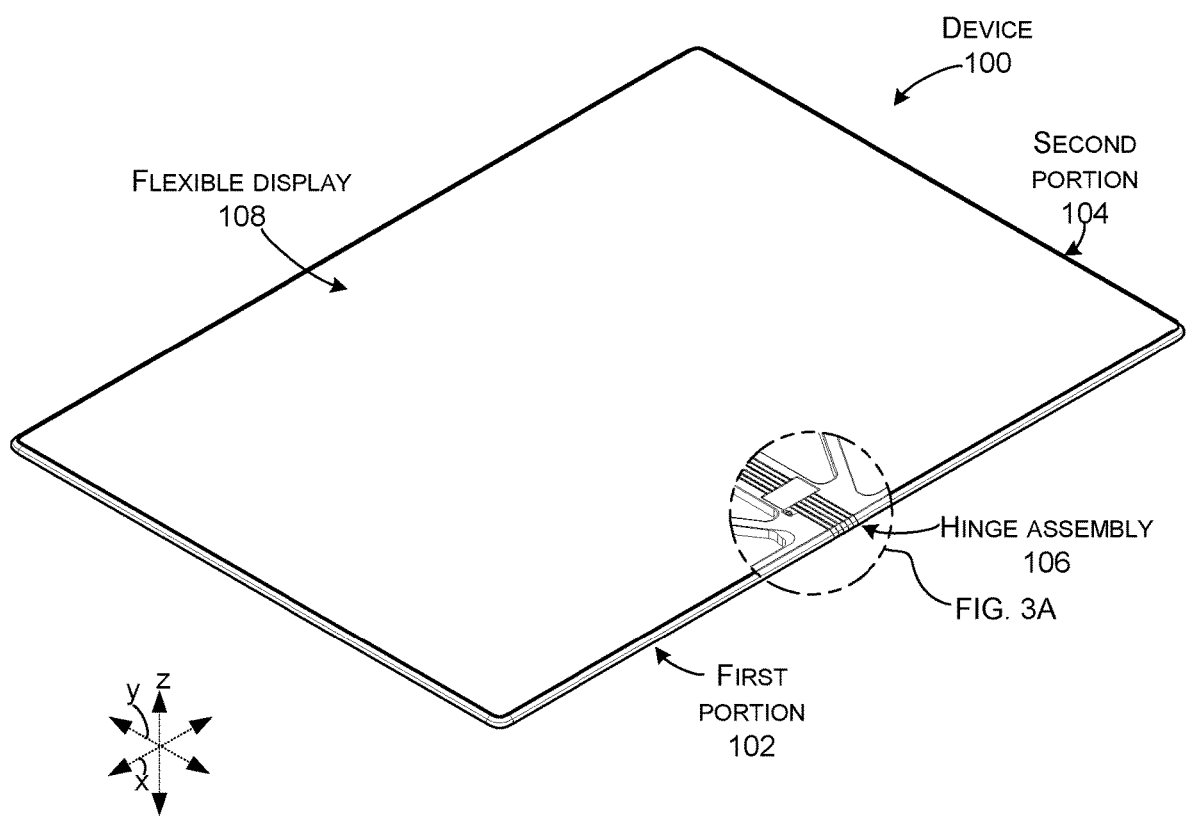

The present concepts relate to hinged devices employing flexible displays. A hinge assembly can rotatably secure two device portions and a single flexible display can span the two device portions. Such devices have been previously contemplated. However, in practice rotation of the first and second portions subjected the flexible display to undesirable stress forces, such as tension and/or compression. To address these problems, previous solutions included mechanisms to allow one end of the hinge or one end of the flexible display to slide during rotation to reduce undesirable forces imparted on the flexible display. These solutions came with their own shortcomings, including complexity and unreliability, among others. The present implementations can employ a self-adjusting arcuate hinge design that can automatically adjust its length during rotation and can maintain the flexible display on the neutral axis during rotation. Flexible displays have advantages over rigid displays, but can be susceptible to damage. Thus, these implementations solve a technical problem of maintaining the flexible display in a neutral environment throughout the range of rotation of the first and second portions.

Introductory FIGS. 1A-1C show an example device 100 that has first and second portions 102 and 104 that are rotatably secured together by a hinge assembly 106. A flexible display 108 is secured to the first and second portions 102 and 104. In this case, the flexible display is fixedly secured to both the first and second portions (e.g., the flexible display does not slide relative to the first and second portions during rotation). This configuration avoids relative movement between the device portions and the flexible display that could cause reliability problems, such as short circuits in circuitry connected to the flexible display.

The radius hinge assembly 106 can allow the computing device 100 to rotate through a range of rotation from a deployed or open orientation (e.g., 180-degrees in this implementation) of FIG. 1A, through a partially open orientation of FIG. 1B, to the storage or closed orientation of FIG. 1C. In some implementations, the closed orientation can be about zero degrees (e.g., in a range of +/− a few degrees, such as 5-degrees). In the illustrated implementation, the closed orientation is about −2-degrees).

The deployed orientation of FIG. 1A can provide the user with a relatively large display area while the storage orientation can provide a smaller device footprint while protecting the flexible display 108 from damage. Intermediate orientations can be utilized for various purposes. For instance, the user may want to use the device in a similar fashion to a notebook computer in the orientation shown in FIG. 1B. The hinge assembly 106 can maintain the device in these various orientations unless acted upon by the user to change the orientation.

The device 100 is shown in a manner to emphasize the flexible display 108 and the hinge assembly 106. However, the device may include other components. For instance, in one case, the first and second portions can be manifest as housings. Electronic components, such as processors and/or storage, may be positioned on and/or in the housing and may be interconnected by conductors extending between the two portions and/or to the flexible display. A myriad of device implementations is contemplated. For instance, the device can be manifest as an e-reader, a laptop computer, a tablet computer, a smart phone computer, a wearable smart device, a display device, a home appliance, a component of an airline seat, and/or a component of a vehicle, among other implementations.

FIG. 2 shows device 100 in an open orientation similar to FIG. 1A. A region of the flexible display 108 is removed to show underlying components. As indicated, the underlying components are shown in an enlarged view in FIG. 3A.

Figure 3A:
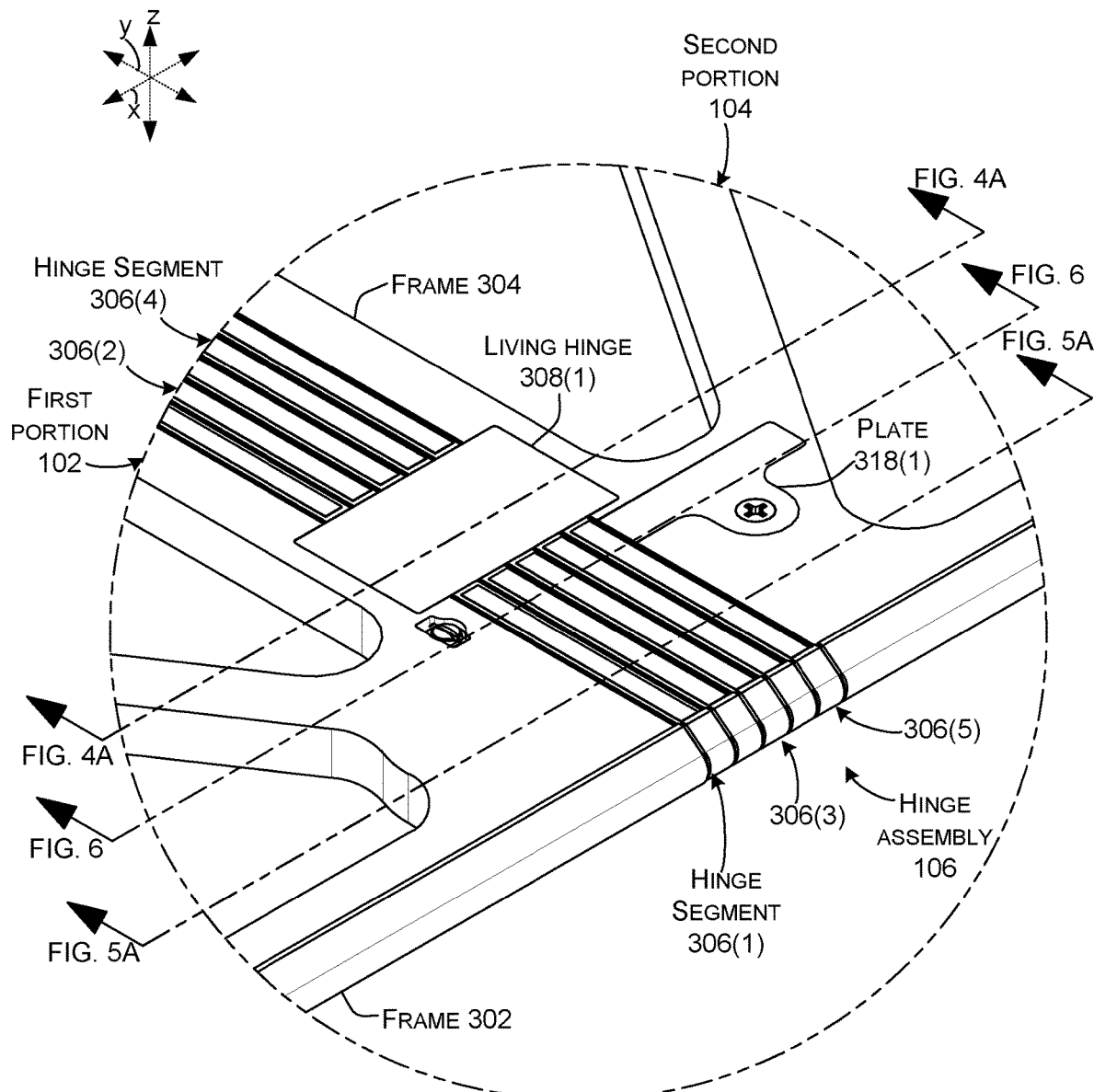
Figure 3B:
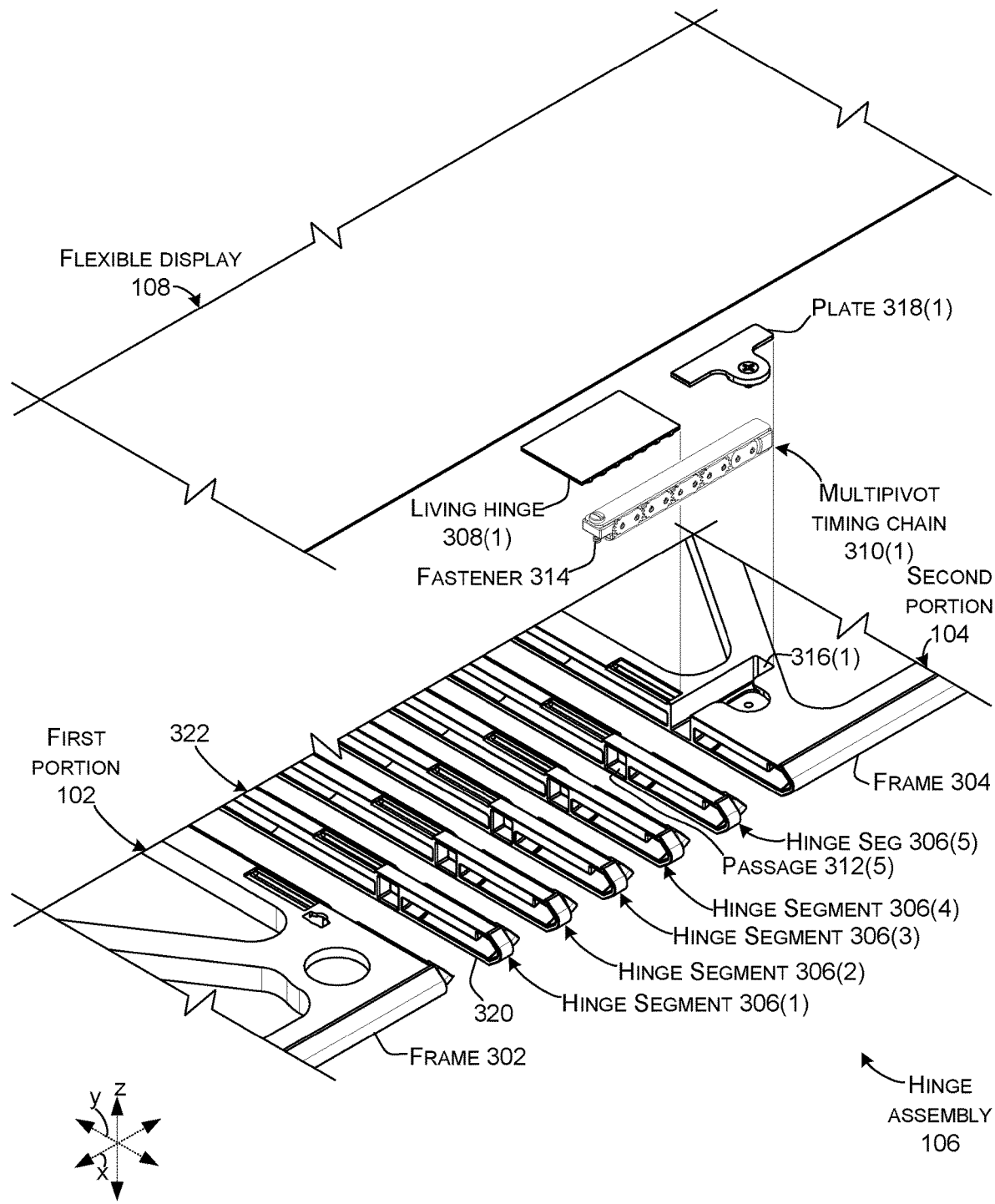
FIG. 3B is an exploded perspective view of an example hinged device that can avoid imparting stress forces on a flexible display in accordance with some implementations of the present concepts.

FIGS. 3A and 3B collectively show hinge assembly 106 and proximate regions of first and second portions 102 and 104. FIG. 3B is an exploded view that is similar to, but not exactly corresponding to FIG. 3A. For instance, FIG. 3B shows flexible display 108, which is not shown in FIG. 3A.

In this implementation, the first portion 102 can include a housing or frame 302 and the second portion 104 can include a housing or frame 304. The hinge assembly 106 can include multiple hinge segments 306, living hinges 308, and multi-pivot timing chains 310. (Only living hinge 308(1) and multi-pivot timing chains 310(1) are shown in these close-up views, but they are illustrative of these elements generally that may occur along a length of the hinge assembly 106 between the first and second portions 102 and 104 (e.g., along they reference axis)). In this case, five hinge segments 306 are employed, but less than five or more than five hinge segments can be employed in other implementations. The hinge segments 306 can be elongate (in this case, as long as the first and second portions) and run parallel to one another and to the first and second portions (e.g., parallel to the y-reference axis).

The hinge segments 306 can define passages 312 (only one of which (312(5)) is designated to avoid clutter on FIG. 3B). The multi-pivot timing chain 310 can extend through the passages 312 and be secured to the first and second portions 102 and 104. In this example, multi-pivot timing chain 310 is fixedly secured to the first portion 102 with a fastener 314. The multi-pivot timing chain 310 is slideably secured to the second portion 104. In this case, the frame 304 defines a channel 316 that receives the multi-pivot timing chain 310. A plate 318 can be fastened to the frame 304 to retain the multi-pivot timing chain 310. The multi-pivot timing chain can synchronize rotation between the hinge segments (e.g., provide simultaneous and even rotation between the hinge segments). This multi-pivot timing chain is described in more detail below relative to FIGS. 6, 10, and 14.

The living hinge 308(1) can be secured to the first portion 102, the hinge segments 306, and the second portion 104. The first and second portions 102 and 104 as well as hinge segments 306 can define voids 402 (not all of which are specifically designated to avoid clutter on the drawing page) facing the flexible display 108. In this case, the living hinge 308(1) can be secured to the hinge segments 306 by extending into the voids 402. Specifically, protuberances 404 (not all of which are specifically designated to avoid clutter on the drawing page) of the living hinge 308(1) can extend into the voids 402 to maintain association between the living hinge 308(1) and the hinge segments (e.g., the living hinge is secured to the hinge segments, but limited movement can occur between the living hinge and the hinge segments). This aspect will be described in more detail below relative to FIGS. 8A, 8B, and 12A.

The living hinge 308(1) can be implemented in various forms. In one case, the living hinge comprises elastomeric materials, such as a monomer or a polymer. In other cases, the living hinge can be formed of multiple materials. For instance, flexible material can be formed around a metal or fibrous mesh. In one implementation, the living hinge 308 is a sheet of flexible elastomeric material.

Figure 4A:
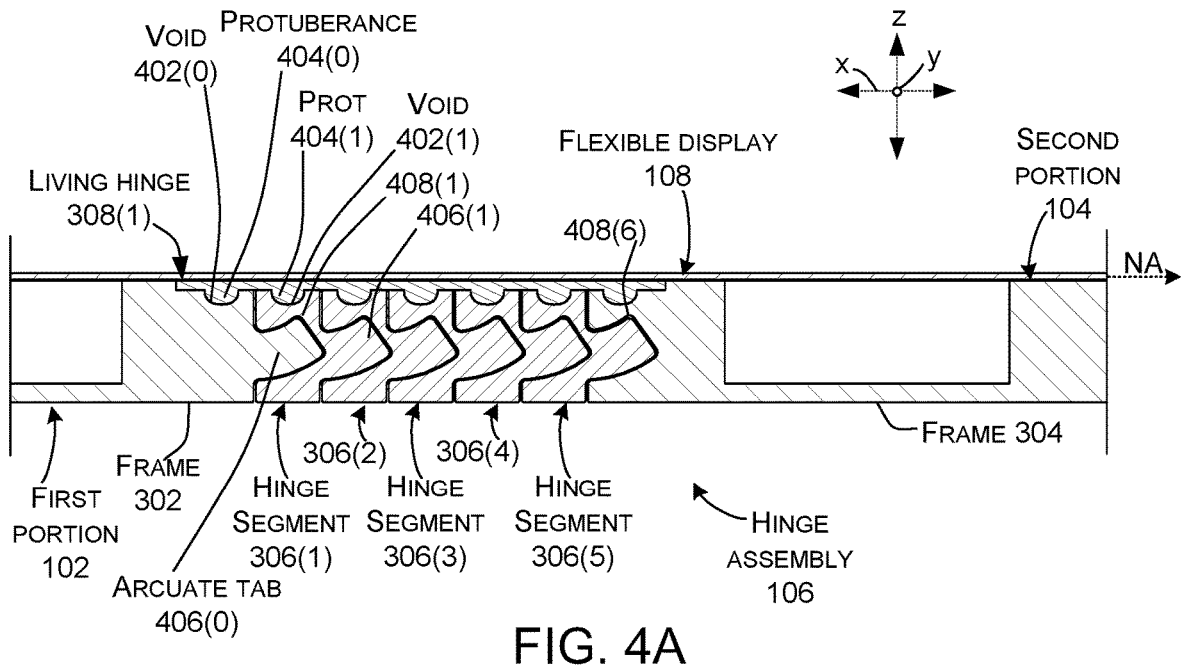
FIGS. 4A, 4C, 5A, 5C, 6, 8A, 8B, 9A, 9B, 10, 12A, 13A, and 14 are sectional views of an example hinged device that can avoid imparting stress forces on a flexible display in accordance with some implementations of the present concepts.

The living hinge 308(1) in combination with the arcuate hinge segments 306 can allow the hinge assembly 106 to rotate while maintaining the neutral axis (NA) at (e.g., co-extensive with), or proximate to, the flexible display 108 (see FIG. 4A). This aspect is discussed and illustrated relative to FIGS. 4A, 8A, and 12A.

Note also that the hinge segments 306 may at first glance appear to simply be cosmetic covers for the hinge assembly 106. Such is not the case, the hinge segments 306 (in combination with the living hinge 308) provide the hinge functionality. Further, as will become apparent below in the sectional views (such as FIG. 4B), outer surfaces 320 (designated relative to hinge segment 306(1)) provide strength and functionality to the hinge segments to such an extent that in some implementations, the hinge segments can be viewed as exoskeletal hinge segments 322 (designated relative to hinge segment 306(1)). In such cases, the exoskeletal hinge segments derive their strength from the outer surfaces 320 and can be hollow and/or can have interior supportive material.

Figure 4B:
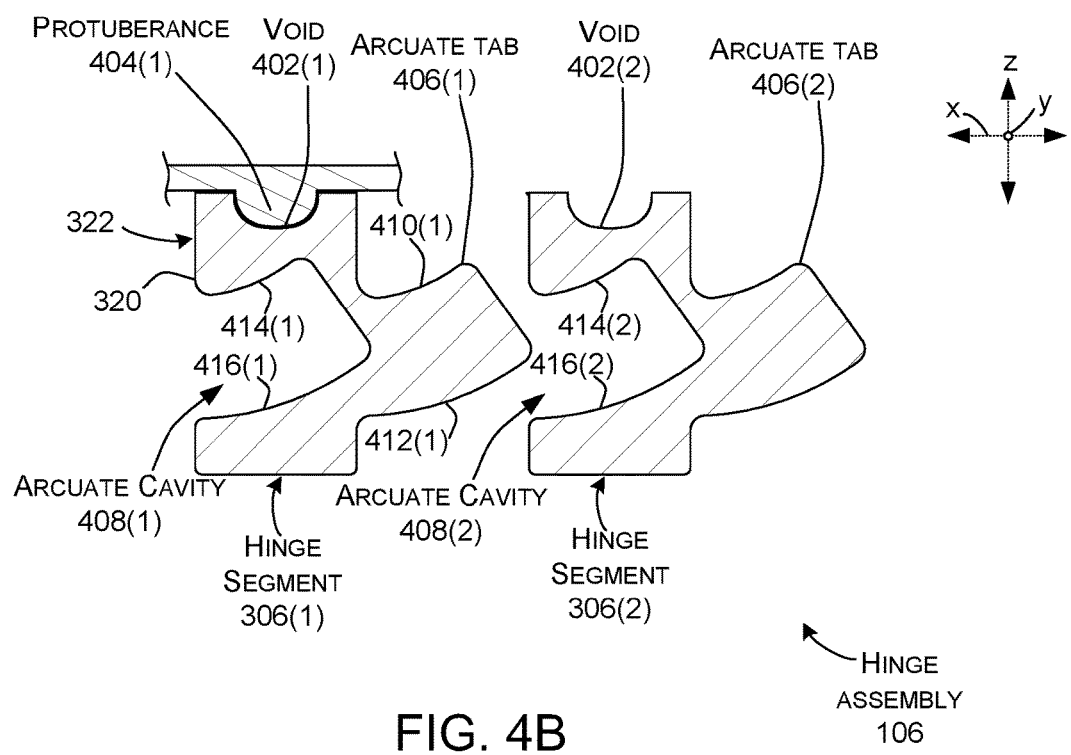
FIGS. 4B and 5B are exploded sectional views of an example hinged device that can avoid imparting stress forces on a flexible display in accordance with some implementations of the present concepts.
Figure 4C:
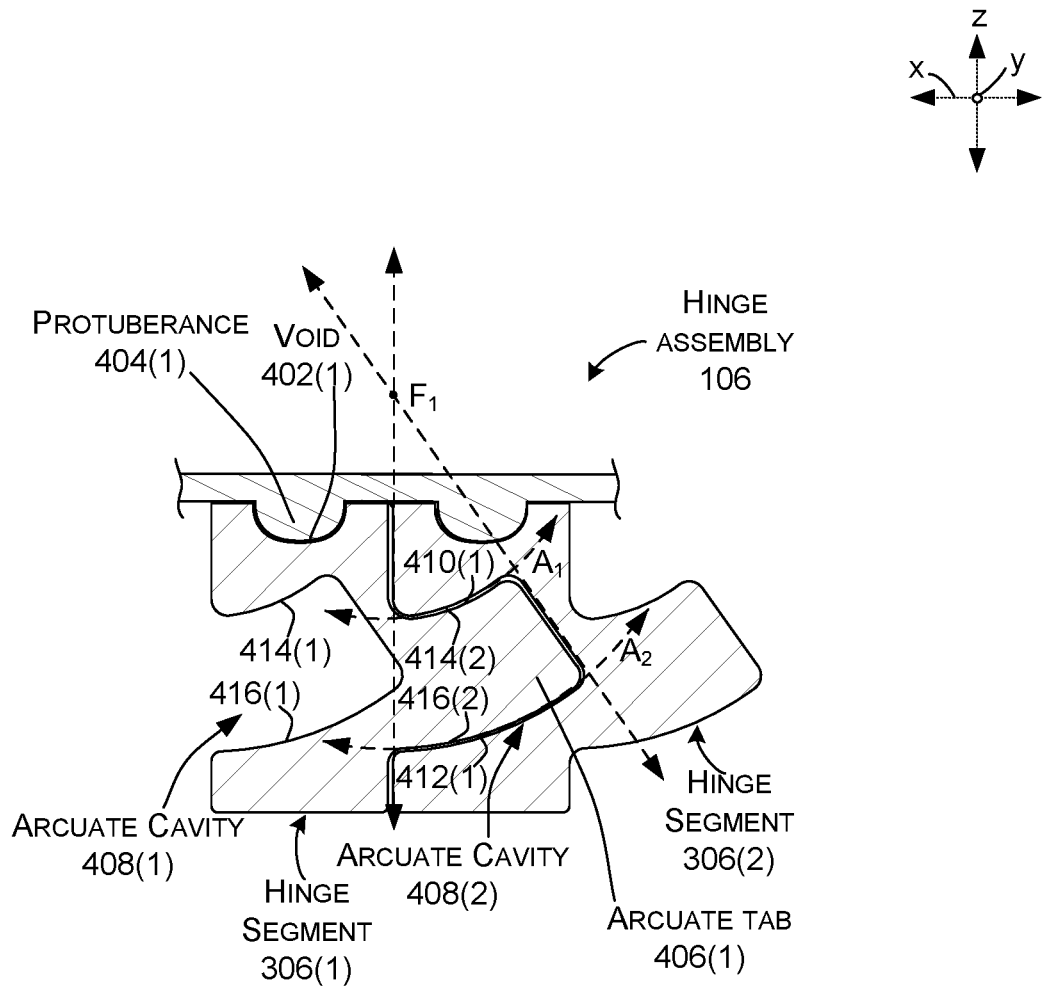

As designated in the exploded view of FIG. 4B, the hinge segments 306 can define arcuate tabs 406 and arcuate cavities 408. (Note also, to integrate the hinge assembly 106 with the first and second portions 102 and 104, the first arcuate tab 406(0) is defined by the first portion 102 and the last arcuate cavity 408(6) is defined by the second portion 104, but other configurations are contemplated). The arcuate tab 406 of an individual hinge segment can interact with, and travel in, the arcuate cavity 408 of the adjacent hinge segment during the range of rotation. In this case, the arcuate tabs 406 can include first and second arcuate sidewalls 410 and 412 and the arcuate cavity includes third and fourth arcuate sidewalls 414 and 416. As indicated in FIG. 4C, the first arcuate sidewall 410, the second arcuate sidewall 412, the third arcuate sidewall 414, and the fourth arcuate sidewall 416 share a common focus F. See for instance, arc $A_1$ representing arcuate sidewalls 410 and 414 and arc $A_2$ representing arcuate sidewalls 412 and 416, that have focus $F_1$.

Figure 12A:
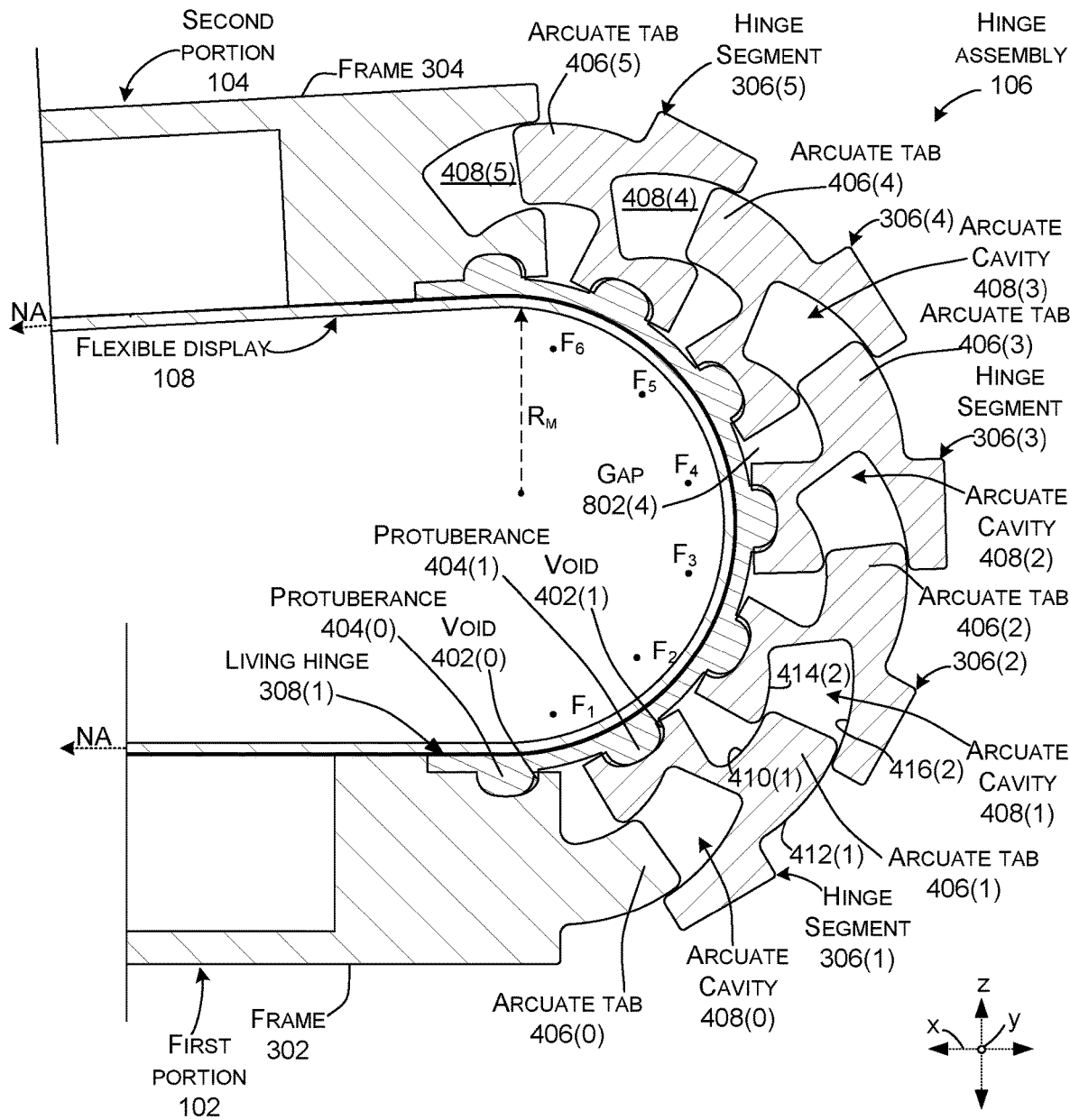

Interaction of adjacent arcuate tabs 406 and arcuate cavities 408 can define the arcuate path of the hinge assembly 106 during rotation. For instance, interaction of the first sidewall 410 and the third sidewall 414 can define a path of the hinge assembly 106 (see for instance. FIG. 4B first sidewall 410(1) and third sidewall 414(2). Ultimately, when taken in combination, the arcuate path of the individual hinge segments 306 can define a minimum bend radius experienced by the flexible display during the range of rotation between the first portion 102 and the second portion 104. The minimum bend radius is indicated in FIG. 12A and can be understood by comparing FIGS. 4A, 8A, and 12A.

Figure 5A:
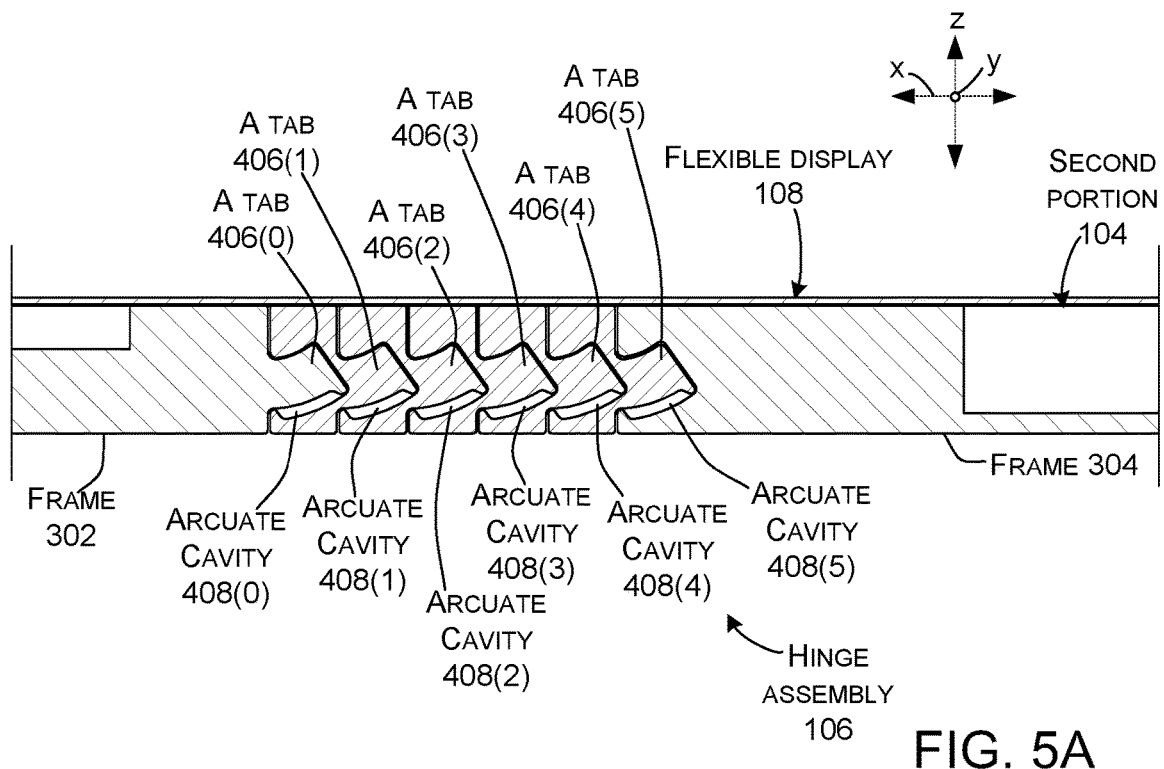
Figure 5B:
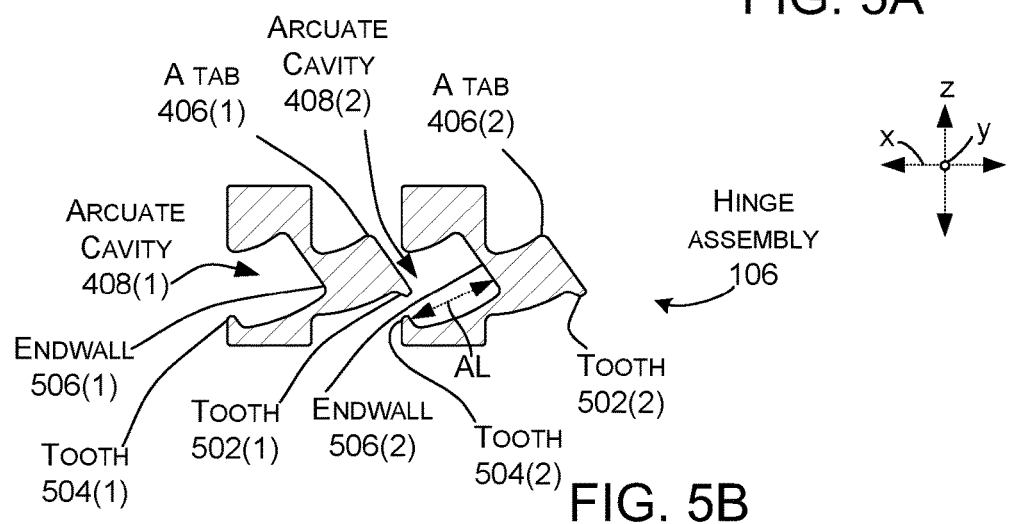
Figure 5C:
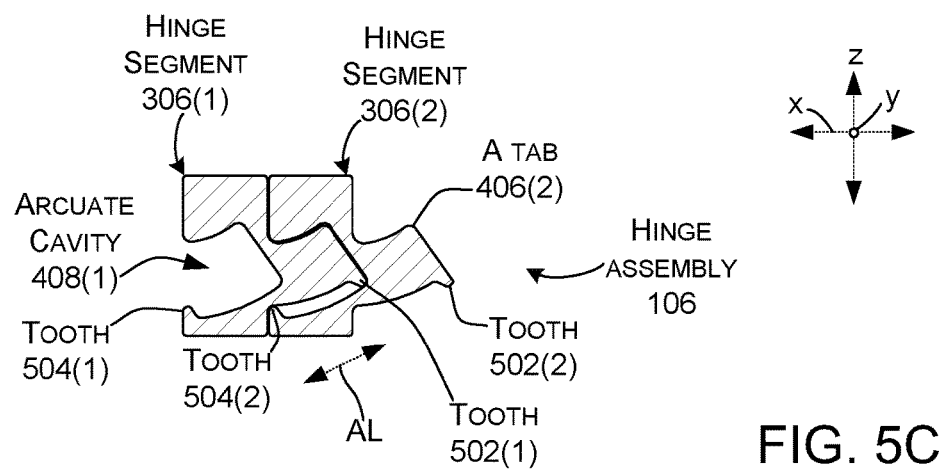

FIGS. 5A-5C show another cross-section through hinge assembly 106 as indicated in FIG. 3A. These views are similar to views 4A-4C, respectively. Here, the arcuate tab 406 of an individual hinge segment includes a tooth 502 and the arcuate cavity 408 of an adjacent hinge segment defines (or is defined by) an opposing tooth 504. Interaction of these teeth 502 and 504 can retain the arcuate tab 406 in the adjacent arcuate cavity 408. Also, an arc length 'AL' between the tooth 504 and an end wall 506 of the arcuate cavity 408 can define a range of rotation between the two adjacent hinge segments 306. Accordingly, the range of rotation of the hinge assembly 106 is the sum of the range of rotations AL defined by the individual hinge segments 306. From another perspective, the sum of the arc lengths AL can define the hinge assembly's range of rotation.

Figure 6:
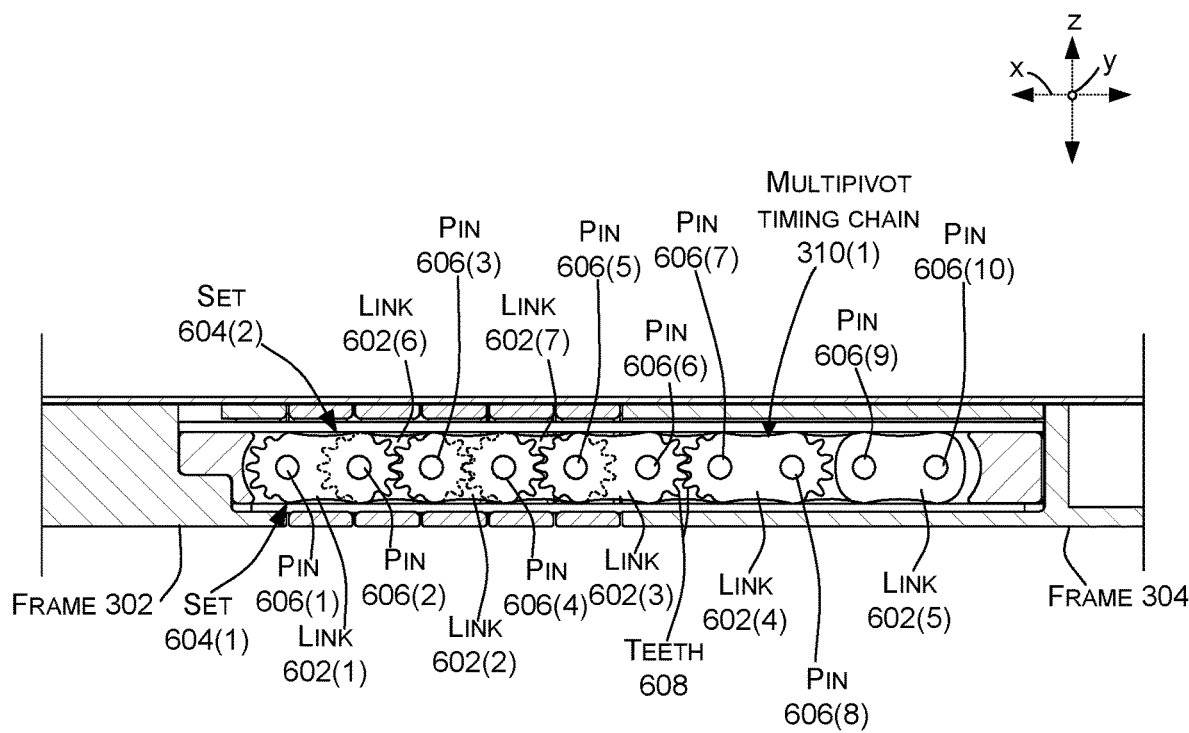
Figure 7:
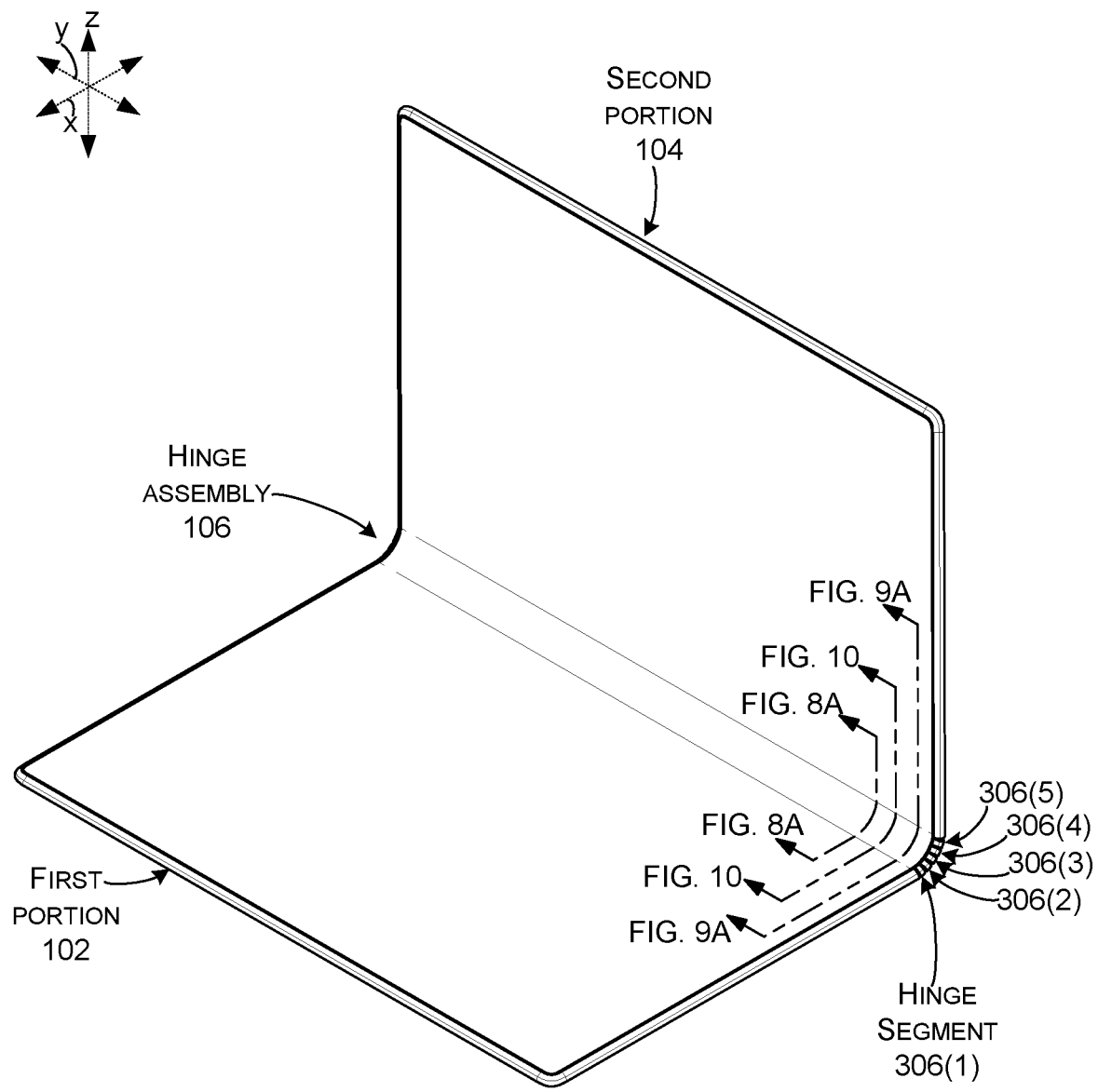

As indicated in FIG. 3A, FIG. 6 is a cross-section through the hinge assembly 106 that shows additional details about the multi-pivot timing chain 310(1). The multi-pivot timing chain can provide timing to the hinge assembly 106. The multi-pivot timing chain can include multiple links 602 arranged in linear sets 604. In this example, the links are arranged in two offset linear sets with set 604(1) toward the reader and 604(2) away from the reader and shown in ghost (dotted lines). Linear set 604(1) includes links 602(1)-602 (5) and linear set 604(2) includes links 602(6)-602(7). (Only a partial set 604(2) is shown to avoid obfuscating the forward set 604(1) with clutter on the drawing page). The links can be arranged on axis pins 606.

Links 602 can include teeth 608. Teeth of adjacent links can intermesh. Intermeshing of the teeth 608 can provide uniform simultaneous rotation around the axis pins 606. The intermeshing teeth can also provide friction, which provides resistance to rotation. The resistance to rotation can help maintain the first and second portions 102 and 104 in a specific orientation unless the user exerts a force to rotate the first and second portions relative to one another. The number of sets can be increased and/or decreased to adjust the resistance to rotation.

FIGS. 7-10 collectively show the hinge assembly in the 90-degree orientation. FIGS. 8A-10 are similar views to FIGS. 4A-6 except that there is not an exploded view corresponding to FIG. 4B.

Figure 8A:
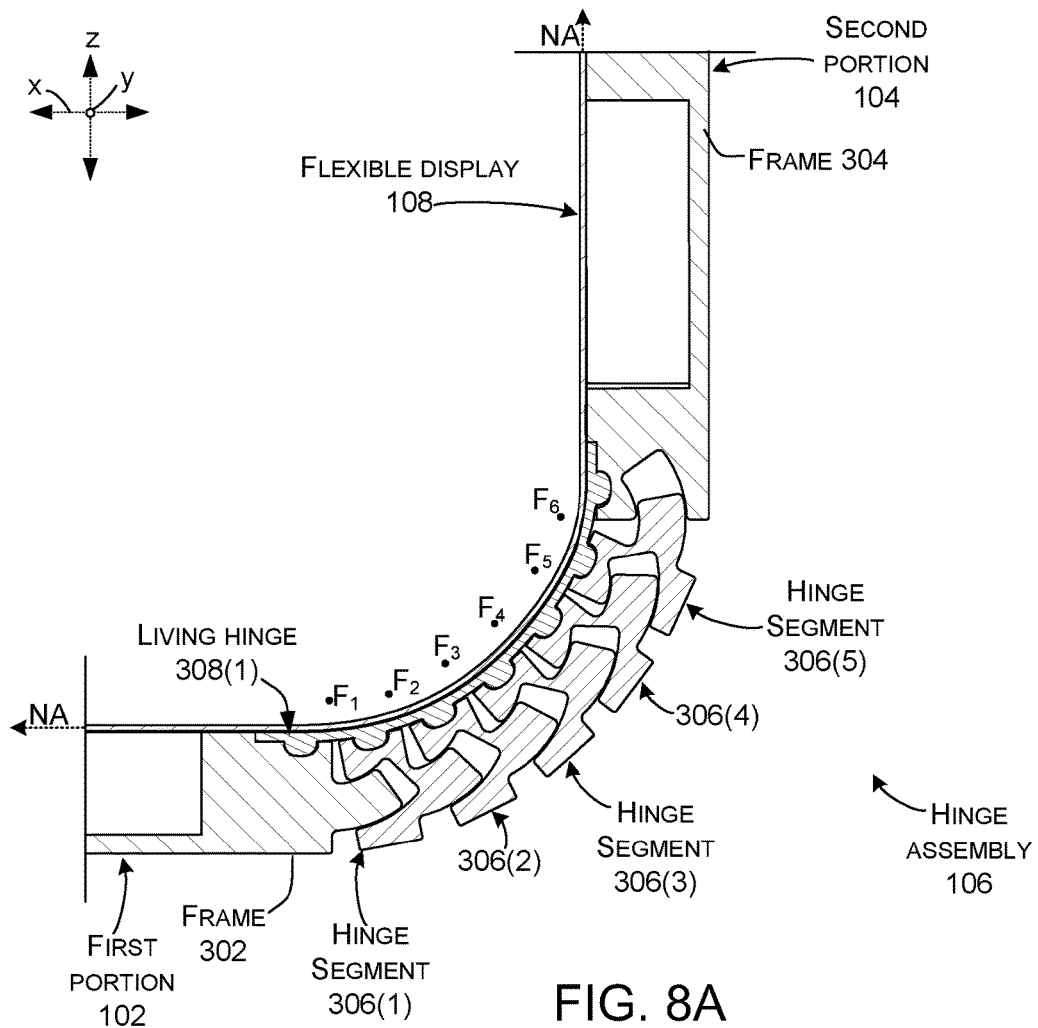
Figure 8B:
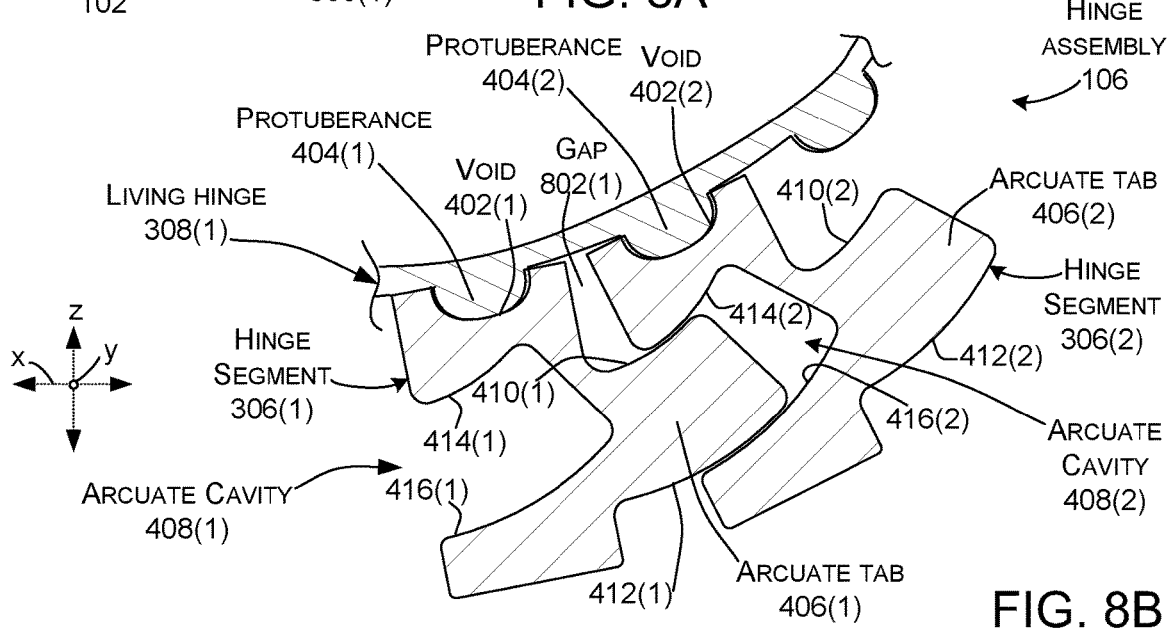

Looking at FIGS. 8A and 8B, the hinge segments 306 are rotating relative to their foci ($F_1$-$F_6$). More specifically, arcuate tabs 406 are traveling in adjacent arcuate cavities 408. On a global scale, the living hinge 308(1) can maintain the first portion 102, hinge segments 306, and second portion 104. However, on a granular scale, the living hinge is allowing subtle relative movement between adjacent hinge segments. For instance, gaps 802 (802(1) designated in FIG. 8B) have opened between adjacent hinge segments as they (the hinge segments) move along their arcuate paths.

Compare to FIG. 4A where the adjacent hinge segments were contacting one another (e.g., no gap). This localized movement can be facilitated by the interactions of the protuberances 404 in their respective voids 402. Further, due to the arcuate nature of the tabs 406 and the cavities 408, the width of the gaps increases with increasing distance from the flexible display 108.

Figure 9A:
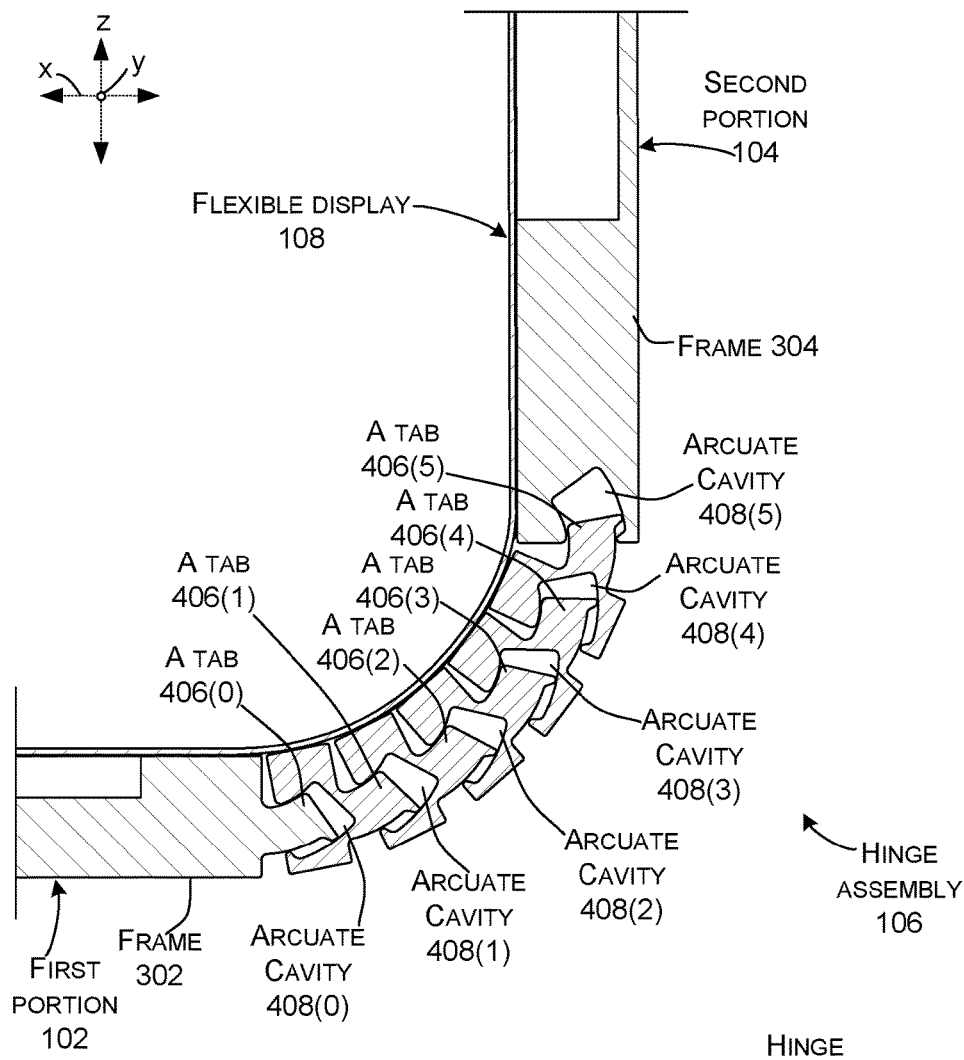
Figure 9B:
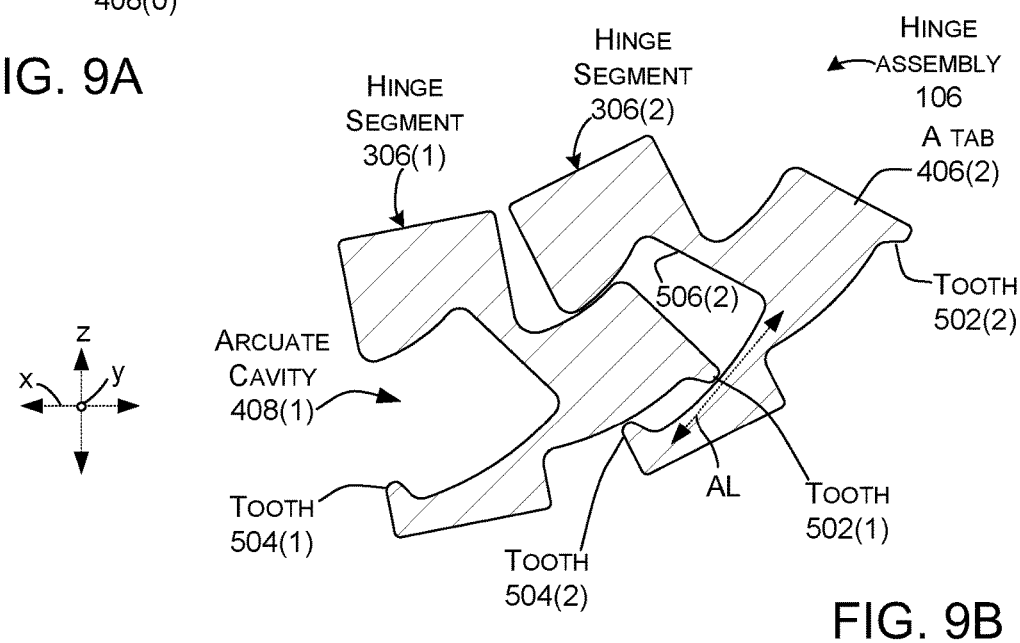

FIG. 9B shows the adjacent hinge segments are about half-way along their arc lengths AL as defined by the position of tooth 502(1) between end wall 506(2) and tooth 504(2).

Figure 10:
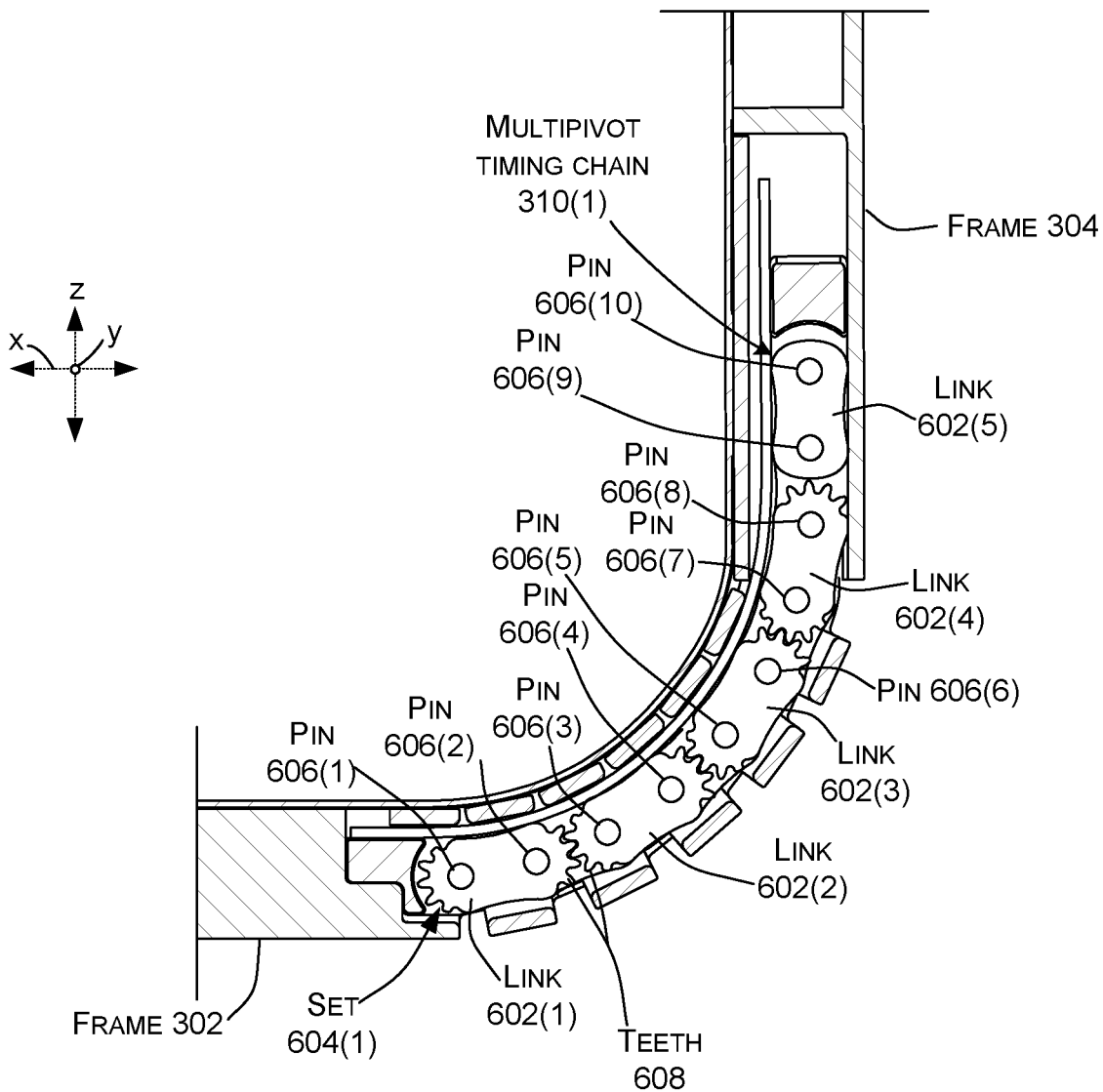

FIG. 10 shows intermeshing teeth 608 timing rotation around the axis pins 606 so that simultaneous and equal rotation occurs around individual axis pins.

FIGS. 11-14 collectively show the hinge assembly in the closed orientation. The views of FIGS. 11-14 are otherwise similar to those of FIGS. 7-10.

FIG. 12A shows the hinge segments 306 continuing to rotate around their respective foci ($F_1$-$F_6$). The living hinge 308 continues to hold the first portion 102, the hinge segments 306 and the second portion 104 together, while allowing relative movement between adjacent hinge segments. Specifically, the living hinge's protuberances 404 can interact with the hinge segment's voids 402 in a ball and socket fashion to allow localized relative movement resulting in increased dimensions of gaps 802 (802(4) designated in FIG. 12A). When viewed collectively, the gaps indicate that the hinge assembly has lengthened as the hinge assembly is rotated from the open orientation to the closed orientation. Further, the lengthening increases with increasing distance from the flexible display (e.g., from a common focus of the bend radius of the flexible display). This arcuate or radial expansion helps to ensure that the common focus of the flexible display's bend radius occurs on an opposite side of the flexible display from the hinge segments 306 though the range of rotation. Further, the arcuate or radial expansion can ensure that the flexible display will not be exposed to stretching or compressing forces during the range of rotation.

At this point (e.g., the closed orientation), the rigid nature of the hinge assembly's hinge segments 306 maintains a minimum bend radius ($R_m$) that the flexible display experiences during the range of rotation. The neutral axis (NA) continues to be co-extensive with the flexible display 108.

Figure 13A:
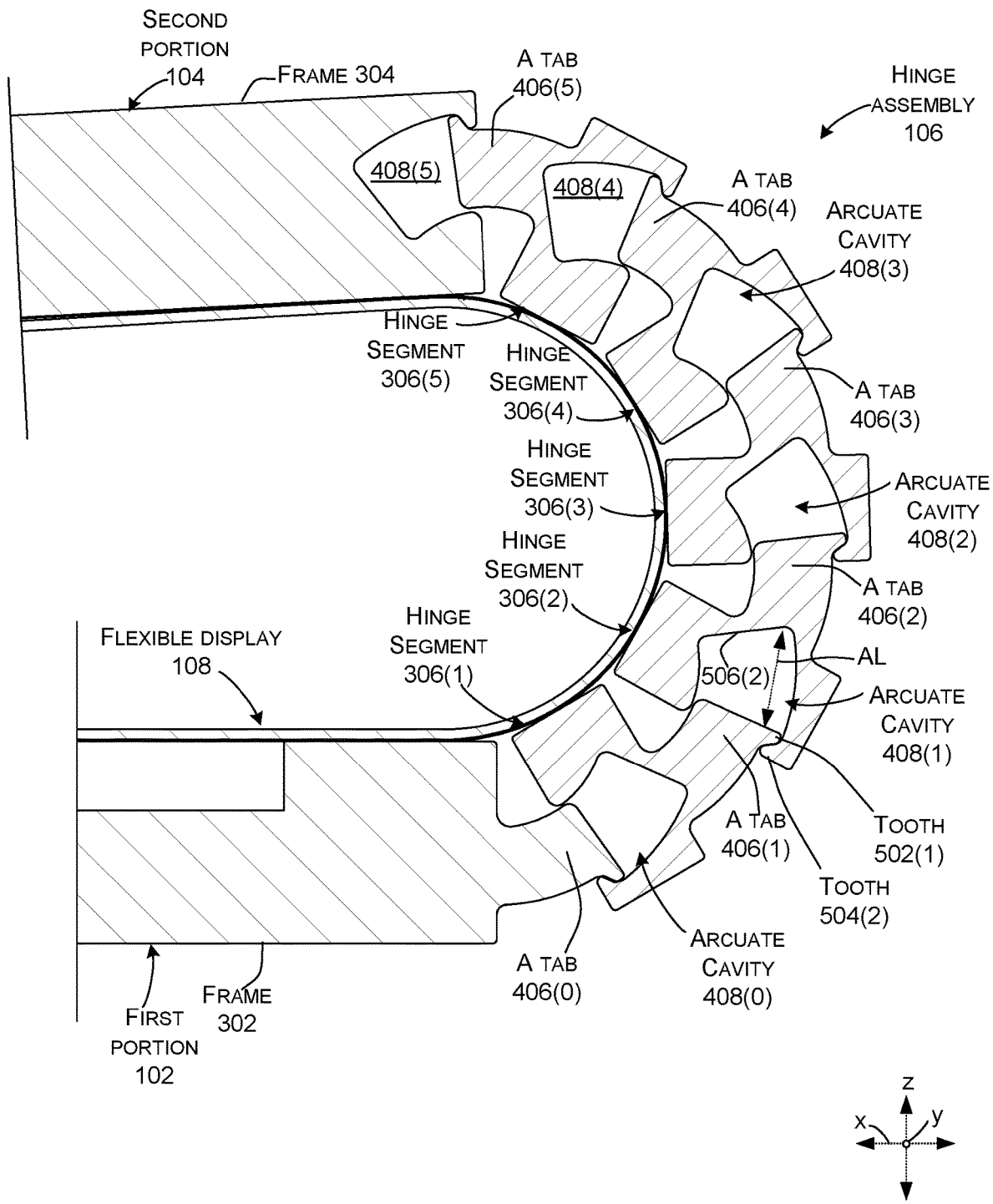

FIG. 13A shows the arcuate tabs 406 have completed their arc lengths AL through the adjacent arcuate cavities 408. For instance, FIG. 5C showed arcuate tab 406(1) against the end wall 506(2). FIG. 9B showed an intervening position. Now, in FIG. 13A the tooth 502(1) is engaging tooth 504(2), which blocks further relative rotation between hinge segment 306(1) and hinge segment 306(2). In this case, approximately 30 degrees of rotation has occurred between frame 302 and hinge segment 306(1) as well as approximately 30 degrees of rotation between each of the adjacent hinge segments 306(1)-306(5), and between hinge segment 306(5) and second portion 104. This produces a collective rotation of about 180 degrees between the open orientation of FIGS. 3A-6 and the closed orientation of FIGS. 11-14.

Figure 14:
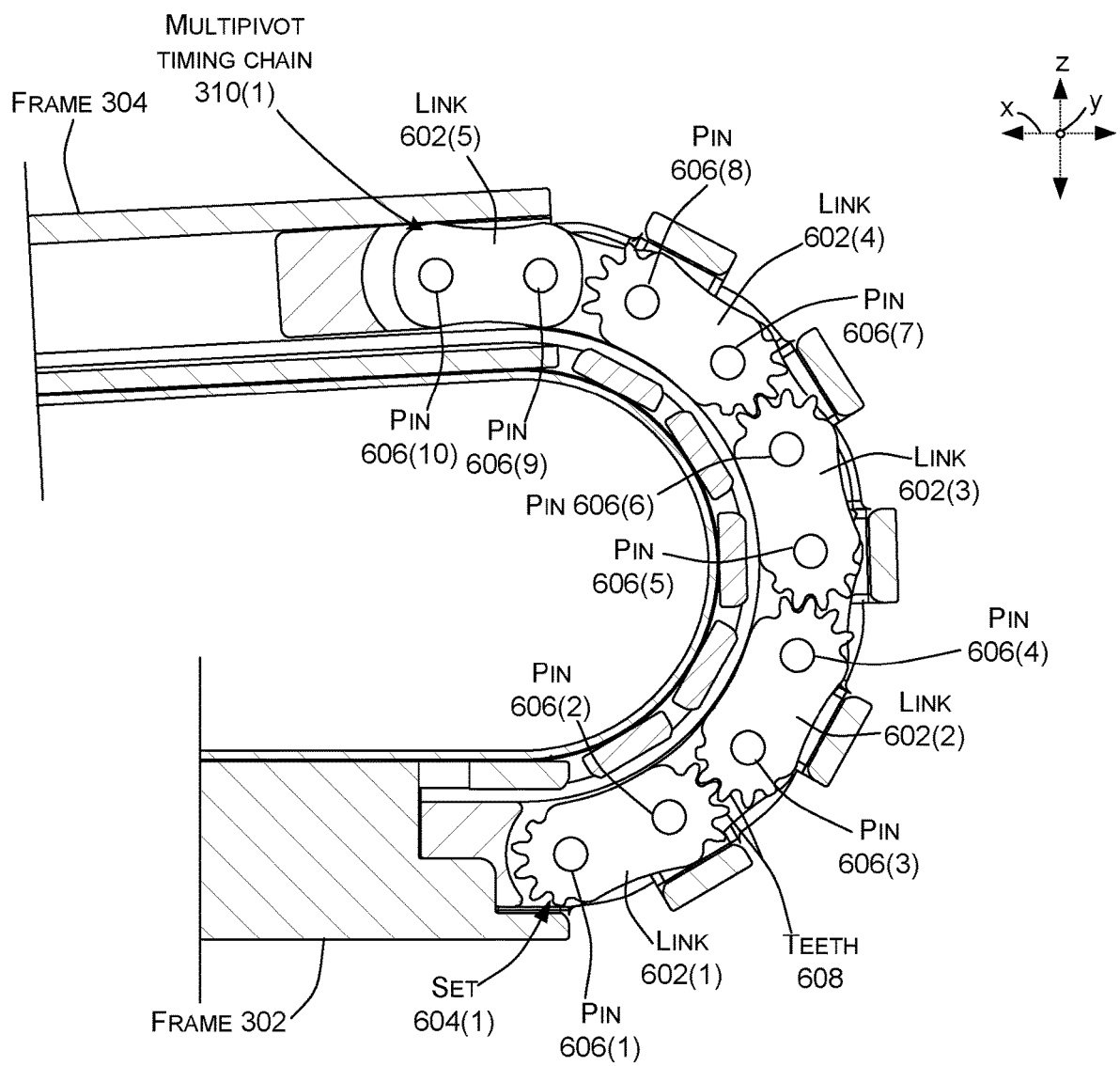

FIG. 14 shows the intermeshing teeth 608 of adjacent links 602 continuing to provide synchronous (e.g., simultaneous and uniform) rotation around the axis pins 606. This facilitates synchronous rotation around the hinge segments 306 of FIG. 13A as rotation of the first and second portions proceed from the open orientation to the closed orientation.

The hinge assemblies described above can employ an arcuate shape that grows and shrinks by an amount dependent on distance from the focus of the bend radius of the flexible display. As such, the hinge assembly grows and shrinks around the flexible display during rotation while maintaining the flexible display coextensively to the neutral axis. Accordingly, no sliding of the hinge assembly or the flexible display is required to protect the display during rotation.

Individual elements of the hinge assembly can be made from various materials, such as sheet metals, die cast metals, machined parts, and/or polymers, such as molded plastics, among others, or any combination of these materials.

Any type of flexible display material(s) can be utilized. Flexible display technologies are rapidly developing and the present concepts can be applied to any of these technologies, such as but not limited to flexible electronic paper based displays, and/or flexible organic light-emitting diode (OLED)-based displays, among others.

Example Methods

Various methods of manufacture, assembly, and use for computing devices, hinge assemblies, and/or flexible displays are contemplated beyond those shown above relative to FIGS. 1-14.

Additional Examples

Various device examples are described above. Additional examples are described below. One example includes a device comprising a first portion and a second portion that are rotatably secured by a hinge assembly from a closed orientation through a range of rotation to an open orientation. A flexible display is fixedly secured to the first and second portions, and the hinge assembly consists of a first hinge segment that defines an arcuate tab that travels in an arcuate cavity of an adjacent second hinge segment during the range of rotation.

Another example can include any of the above and/or below examples where the device consists of a living hinge secured to the first portion, the first hinge segment, the second hinge segment, and the second portion.

Another example can include any of the above and/or below examples where the living hinge comprises a sheet of flexible elastomeric material.

Another example can include any of the above and/or below examples where the first hinge segment and the second hinge segment define voids facing the flexible display.

Another example can include any of the above and/or below examples where the living hinge is secured to the first hinge segment and the second hinge segment by extending into the voids.

Another example can include any of the above and/or below examples where the device further consists of a multi-pivot timing chain extending through the first and second hinge segments and secured to the first portion and the second portion.

Another example can include any of the above and/or below examples where the multi-pivot timing chain is fixedly secured to the first portion and slideably secured to the second portion.

Another example can include any of the above and/or below examples where the multi-pivot timing chain synchronizes rotation between the first and second hinge segments.

Another example can include any of the above and/or below examples where the multi-pivot timing chain includes intermeshing gears that cause simultaneous and equal rotation around each hinge axis of the multi-pivot timing chain.

Another example can include any of the above and/or below examples where the first and second hinge segments comprise hollow exoskeletons.

Another example can include any of the above and/or below examples where the arcuate tab of the first hinge segment includes a tooth and the arcuate cavity of the second hinge segment defines an opposing tooth.

Another example can include any of the above and/or below examples where an arc length between the opposing tooth and an end wall of the arcuate cavity define a range of rotation between the first hinge segment and the second hinge segment.

Another example can include any of the above and/or below examples where engagement of the tooth and the opposing tooth retain the arcuate tab in the arcuate cavity.

Another example can include any of the above and/or below examples where the closed orientation comprises negative two degrees and the open orientation comprises one hundred and eighty degrees.

Another example includes a device comprising a first portion and a second portion, as well as a first exoskeletal hinge segment secured to the first portion and a second exoskeletal hinge segment secured to the second portion, the first exoskeletal hinge segment defining an arcuate tab that travels in an arcuate cavity defined by the second exoskeletal hinge segment to allow relative rotation between the first and second portions.

Another example can include any of the above and/or below examples where the arcuate tab includes first and second arcuate sidewalls and the arcuate cavity includes third and fourth arcuate sidewalls.

Another example can include any of the above and/or below examples where the first arcuate sidewall, the second arcuate sidewall, the third arcuate sidewall, and the fourth arcuate sidewall share a common focus.

Another example can include any of the above and/or below examples where a device further comprises a single flexible display fixedly secured to the first portion and to the second portion.

Another example can include any of the above and/or below examples where the common focus is on an opposite side of the flexible display as the first and second exoskeletal hinge segments.

Another example can include any of the above and/or below examples where interaction of the first sidewall and the third sidewall define a minimum bend radius experienced by the single flexible display during a range of rotation between the first portion and the second portion.

Another example includes a device comprising a first portion and a second portion rotatably secured by a hinge assembly, a flexible display fixedly secured to the first and second portions, and the hinge assembly comprising a set of elongate hinge segments, adjacent hinge segment moving arcuately relative to one another during rotation of the first and second portions.

CONCLUSION

Although techniques, methods, devices, systems, etc., pertaining to hinged devices that employ flexible displays are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A device, comprising:
    a first portion and a second portion that are rotatably secured by a hinge assembly through a range of rotation from a closed orientation to an open orientation; and
    a flexible display fixedly secured to the first and second portions;
    the hinge assembly comprising a first hinge segment that defines an arcuate tab that travels in an arcuate cavity of an adjacent second hinge segment during the range of rotation, the first portion, the second portion, the first hinge segment, and the second hinge segment defining respective voids facing the flexible display, and
    the hinge assembly comprising a hinge secured to the first portion, the first hinge segment, the second hinge segment, and the second portion, the hinge defining protuberances having a partial cylindrical shape that extend into the respective voids and interact with the respective voids in a ball-and-socket fashion.

2. The device of claim 1, further comprising a multi-pivot timing chain extending through the first and second hinge segments and secured to the first portion and the second portion.

3. The device of claim 2, wherein the multi-pivot timing chain is fixedly secured to the first portion and slideably secured to the second portion.

4. The device of claim 2, wherein the multi-pivot timing chain synchronizes rotation between the first and second hinge segments.

5. The device of claim 2, wherein the multi-pivot timing chain includes intermeshing gears that cause simultaneous and equal rotation around each hinge axis of the multi-pivot timing chain.

6. The device of claim 1, wherein the arcuate tab of the first hinge segment includes a tooth and the arcuate cavity of the second hinge segment defines an opposing tooth.

7. The device of claim 6, wherein an arc length between the opposing tooth and an end wall of the arcuate cavity define a range of rotation between the first hinge segment and the second hinge segment.

8. The device of claim 6, wherein engagement of the tooth and the opposing tooth retain the arcuate tab in the arcuate cavity.

9. The device of claim 1, wherein the arcuate cavity includes two arcuate sidewalls that are parallel.

10. The device of claim 1, wherein the hinge assembly maintains a neutral axis coextensively with the flexible display through the range of rotation.

11. The device of claim 1, wherein the hinge assembly creates a gap between the first hinge segment and the second hinge segment and thereby increases a length of a surface of the hinge assembly facing the flexible display as the hinge assembly is rotated from the open orientation to the closed orientation.

12. A device, comprising:
    a first portion and a second portion rotatably secured by a hinge assembly; and,
    a flexible display fixedly secured to the first and second portions;
    the hinge assembly comprising a set of elongate hinge segments, adjacent hinge segments moving arcuately relative to one another during rotation of the first and second portions, at least one of the adjacent hinge segments having an arcuate cavity that receives an individual adjacent hinge segment and includes two arcuate sidewalls, the first portion, the second portion, and the set of elongate hinge segments defining respective voids facing the flexible display, and the hinge assembly comprising a hinge secured to the first portion, the second portion, and the set of elongate hinge segments, the hinge defining protuberances having a partial cylindrical shape that extend into the respective voids and interact with the respective voids in a ball-and-socket fashion.

13. The device of claim 12, further comprising:
a multi-pivot timing chain that synchronizes rotation of the hinge segments.

14. The device of claim 13, wherein the multi-pivot timing chain includes multiple linear sets of links.

15. The device of claim 14, wherein the links include intermeshing teeth and the links rotate simultaneously as the first portion and the second portion rotate.

16. The device of claim 13, wherein the multi-pivot timing chain extends through the hinge segments.

17. The device of claim 12, wherein the two arcuate sidewalls are equidistant.

18. The device of claim 12, wherein the two arcuate sidewalls share a common focus.

19. The device of claim 12, wherein the hinge assembly maintains a neutral axis coextensively with the flexible display throughout a range of rotation between the first portion and the second portion.

20. The device of claim 12, wherein the hinge assembly creates gaps between the hinge segments and thereby increases a length of a surface of the hinge assembly facing the flexible display as the hinge assembly is rotated from an open orientation to a closed orientation.

* * * * *